United States Patent
Bostick et al.

(10) Patent No.: US 9,292,495 B2
(45) Date of Patent: Mar. 22, 2016

(54) CONTEXTUAL UPDATING OF EXISTING DOCUMENTS USING NATURAL LANGUAGE PROCESSING

(71) Applicant: International Business Machines Corporation, Armonk, NY (US)

(72) Inventors: James E. Bostick, Cedar Park, TX (US); John M. Ganci, Jr., Cary, MN (US); Stephen G. Meyer, Chicago, IL (US); Craig M. Trim, Glendale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 14/184,903

(22) Filed: Feb. 20, 2014

(65) Prior Publication Data

US 2015/0234810 A1 Aug. 20, 2015

(51) Int. Cl.
*G06F 17/28* (2006.01)
*G06F 17/24* (2006.01)

(52) U.S. Cl.
CPC .............. *G06F 17/28* (2013.01); *G06F 17/241* (2013.01)

(58) Field of Classification Search
CPC ...................................................... G06F 17/28
See application file for complete search history.

(56) References Cited

U.S. PATENT DOCUMENTS

| | | | |
|---|---|---|---|
| 6,088,707 A | 7/2000 | Bates et al. | |
| 7,885,987 B1 * | 2/2011 | Lee | 707/923 |
| 8,527,493 B1 * | 9/2013 | Hamatake | 707/707 |
| 2009/0144395 A1 | 6/2009 | DeSalvo | |
| 2012/0054295 A1 | 3/2012 | Cai et al. | |
| 2014/0129213 A1 * | 5/2014 | Kimelfeld et al. | 704/9 |
| 2014/0215322 A1 * | 7/2014 | Gunderson | 715/251 |
| 2015/0149429 A1 * | 5/2015 | Chilakamarri et al. | 707/706 |

OTHER PUBLICATIONS

Tuexen et al; Stream Control Transmission Protocol (SCTP) Chunk Flags Registration, Jan. 26, 2011.
Anonymous, Determining the Validity of Broken Links through Intelligence and Contextual Analysis, Jan. 8, 2013.
Angoss, Predictive lead and opportunity scoring stop guessing, start predicting, 2014.

* cited by examiner

*Primary Examiner* — Qian Yang
(74) *Attorney, Agent, or Firm* — Garg Law Firm, PLLC; Rakesh Garg; Matthew Chung (57) ABSTRACT

A method, system, and computer program product for contextual updating of existing documents using natural language processing (NLP) are provided in the illustrative embodiments. Information is received about a subject-matter domain. A portion of the existing document is identified, where the portion corresponds to the subject-matter domain. A search query is formed based on the portion, wherein the search query returns a result set, the result set including current information corresponding to the subject-matter domain, the current information being recent as compared to an age of the portion. A natural language (NL) update content is formed by processing the current information through an NLP application. The existing document is updated using the NL update content.

20 Claims, 6 Drawing Sheets

CONTEXTUAL UPDATING OF EXISTING DOCUMENTS USING NATURAL LANGUAGE PROCESSING

TECHNICAL FIELD

The present invention relates generally to a method, system, and computer program product for updating existing documents. More particularly, the present invention relates to a method, system, and computer program product for contextual updating of existing documents using natural language processing.

BACKGROUND

Document repositories include documents that are created for a variety of purposes over time and that include a variety of content. With the passage of time, availability of new information, changes in business environment, marketplace dynamics, changed needs, or due to a combination of these and other factors, the contents of an existing document, an old document, have to be updated.

Natural language processing (NLP) is a technique that facilitates exchange of information between humans and data processing systems. For example, one branch of NLP pertains to answering questions about a subject matter based on information available about the subject matter domain.

Information about a domain can take many forms and can be sourced from any number of data sources. The presenter of the information generally selects the form and content of the information. Before information can be used for NLP, generally, the information has to be transformed into a form that is usable by an NLP engine.

SUMMARY

The illustrative embodiments provide a method, system, and computer program product for contextual updating of existing documents using natural language processing. An embodiment includes a method for updating an existing document using natural language processing (NLP). The embodiment receives information about a subject-matter domain. The embodiment identifies a portion of the existing document, wherein the portion corresponds to the subject-matter domain. The embodiment forms a search query based on the portion, wherein the search query returns a result set, the result set including current information corresponding to the subject-matter domain, the current information being recent as compared to an age of the portion. The embodiment forms natural language (NL) update content by processing the current information through an NLP application. The embodiment updates the existing document using the NL update content.

Another embodiment includes a computer program product for updating an existing document using natural language processing (NLP). The embodiment further includes one or more computer-readable tangible storage devices. The embodiment further includes program instructions, stored on at least one of the one or more storage devices, to receive information about a subject-matter domain. The embodiment further includes program instructions, stored on at least one of the one or more storage devices, to identify a portion of the existing document, wherein the portion corresponds to the subject-matter domain. The embodiment further includes program instructions, stored on at least one of the one or more storage devices, to form a search query based on the portion, wherein the search query returns a result set, the result set including current information corresponding to the subject-matter domain, the current information being recent as compared to an age of the portion. The embodiment further includes program instructions, stored on at least one of the one or more storage devices, to form natural language (NL) update content by processing the current information through an NLP application. The embodiment further includes program instructions, stored on at least one of the one or more storage devices, to update the existing document using the NL update content.

Another embodiment includes a computer system for updating an existing document using natural language processing (NLP. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to receive information about a subject-matter domain. The embodiment further includes program instructions, stored on at least one of the one or more storage devices for execution by at least one of the one or more processors via at least one of the one or more memories, to identify a portion of the existing document, wherein the portion corresponds to the subject-matter domain. The embodiment further includes program instructions, stored on at least one of the one or more storage devices for execution by at least one of the one or more processors via at least one of the one or more memories, to form a search query based on the portion, wherein the search query returns a result set, the result set including current information corresponding to the subject-matter domain, the current information being recent as compared to an age of the portion. The embodiment further includes program instructions, stored on at least one of the one or more storage devices for execution by at least one of the one or more processors via at least one of the one or more memories, to form natural language (NL) update content by processing the current information through an NLP application. The embodiment further includes program instructions, stored on at least one of the one or more storage devices for execution by at least one of the one or more processors via at least one of the one or more memories, to update the existing document using the NL update content.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A salesperson makes notes during a sales call with a customer. The notes include unorganized or unstructured information about one or more conversations pertaining to one or more topics. For example, a part of the meeting during which the salesperson takes notes may concern the customer's industry generally. Another part of the meeting may concern a need or limitation experienced by the customer during a given period. Another part of the meeting may concern a product or products the salesperson is offering, a product or products a competitor is offering, or a product or features the customer desires. Another part of the meeting may concern topics for a follow-up discussion.

A context is a subject-matter area to which a portion of a document pertains. For example, each example concern described above is a context. The salesperson's notes include portions pertaining to these example concerns and other similar concerns. Those portions in the salesperson's notes are therefore related to those respective contexts. For example, one portion of the notes relates or corresponds to the industry context, another portion of the notes corresponds to product features context, and yet another portion of the notes corresponds to the context of a follow-up topic.

The illustrative embodiments recognize, as in the above example, that a document created at a certain point in time and under certain circumstances can include one or more portions directed to one or more contexts. Furthermore, such contextual portions may have to be updated differently, at different intervals, for different purposes, using different data sources, or a combination thereof.

For example, the salesperson's notes may include a portion that pertains to an undesirable product feature context, to wit, a product feature that the customer finds undesirable at the time of the meeting. For a future meeting, that portion of the notes document should be updated with current information about industry trends as to that feature, factors affecting the desirability of the feature after the time the old notes were taken, and other information that could alter the customer's opinion of the feature in the future meeting.

At the same time, the update should selectively exclude information that is not related to the context within a threshold degree. For example, the context of an undesirable feature is related to information about a similar feature in some product in the market, but is probably not sufficiently related to a new feature that product includes. The manner of relating a piece of information to a context, a degree of such relation, and thresholds for comparing such degrees of relations are dependent upon the nature of the subject matter in question.

As one example, a piece of information is regarded as related to a given context if the piece includes at least a threshold number of textual matches with the product name or a synonym thereof. As another example, a piece of information is regarded as related to a given context if the piece includes at least a threshold number of references to a category of the named product or an equivalent thereof.

Some other examples of old documents with portions pertaining to different contexts include product documentation, catalogs, conversation records, whitepapers, research work products, and publications. For the foregoing reasons, and other similar reasons, the illustrative embodiments recognize that updating a portion of, or the entirety of, an old document is often a non-trivial task.

The illustrative embodiments used to describe the invention generally address and solve the above-described problems and other problems related to the updating old documents. The illustrative embodiments provide a method, system, and computer program product for contextual updating of existing documents using natural language processing.

An embodiment identifies a context, e.g., a product, a feature, a topic, a subject, or a subject-matter domain, that is to be used for updating a set of one or more old documents. As an example, the embodiment receives the context information by receiving an ontology, a taxonomy, or a lexicon of context-specific terms, phrases, or information.

In an old document from the set of old documents, an embodiment identifies a set of one or more portions that relate or correspond to the provided context. The embodiment parses the text of the identified set of portions so that one or more natural language (NL) search queries, search criteria, or a combination thereof, can be constructed. A search query searches for data that satisfies a condition in the query. A search criterion is a condition that bounds the scope of the search, the information that is searched for such data, or both. A search can use a search query, a search criterion, or both. Within the scope of the disclosure, a circumstance of using a search query or a search criterion can also include a circumstance of using the search query and the search criterion unless otherwise specified.

In one example, a sentence in a portion is parsed to identify the {subject, predicate, object} triple from which an NL query or criterion can be constructed. In another example, a group of words are lemmatized to identify one or more terms to use in an NL search query or criterion. From this disclosure, those of ordinary skill in the art will be able to conceive many other ways of parsing the contents of an identified portion of an old document for a similar purpose, and the same are contemplated within the scope of the illustrative embodiments.

An embodiment uses the contextual search queries and/or criteria constructed from a portion of an old document to identify a set of current information that is relevant to the context and satisfies the NL search query or criterion. For example, at any given time, a set of one or more data sources may provide a variety of current information about a variety of contexts. Current information is information that is believed to be up-to-date at the given time.

Some data sources in the set of data sources provide current information that is relevant to the context in question. The embodiment identifies such data sources, applies the search query or criterion, and finds current contextual information.

An embodiment further constructs NL content from the found current contextual information. An embodiment applies the NL content to the old document, thereby contextually updating the old document with current information using NLP.

The illustrative embodiments are described with respect to certain contexts, documents, document types, data, forms of data, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
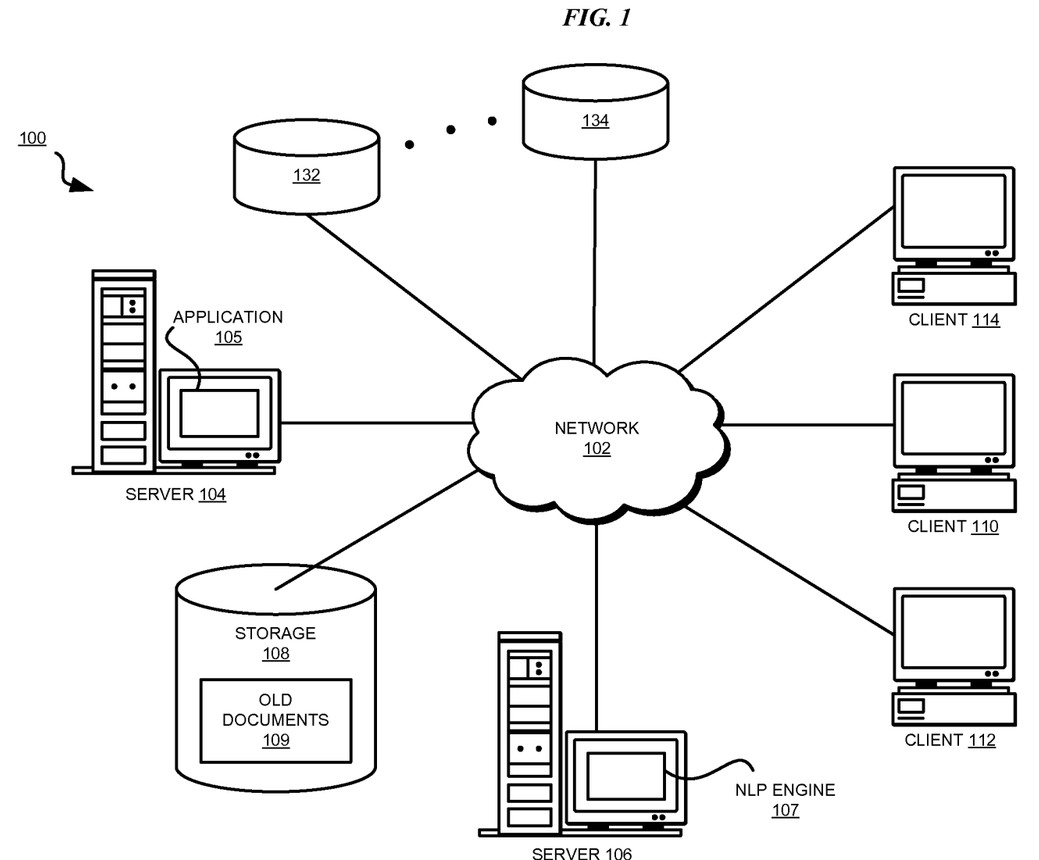
FIG. 1 depicts a block diagram of a network of data processing systems in which illustrative embodiments may be implemented.
Figure 2:
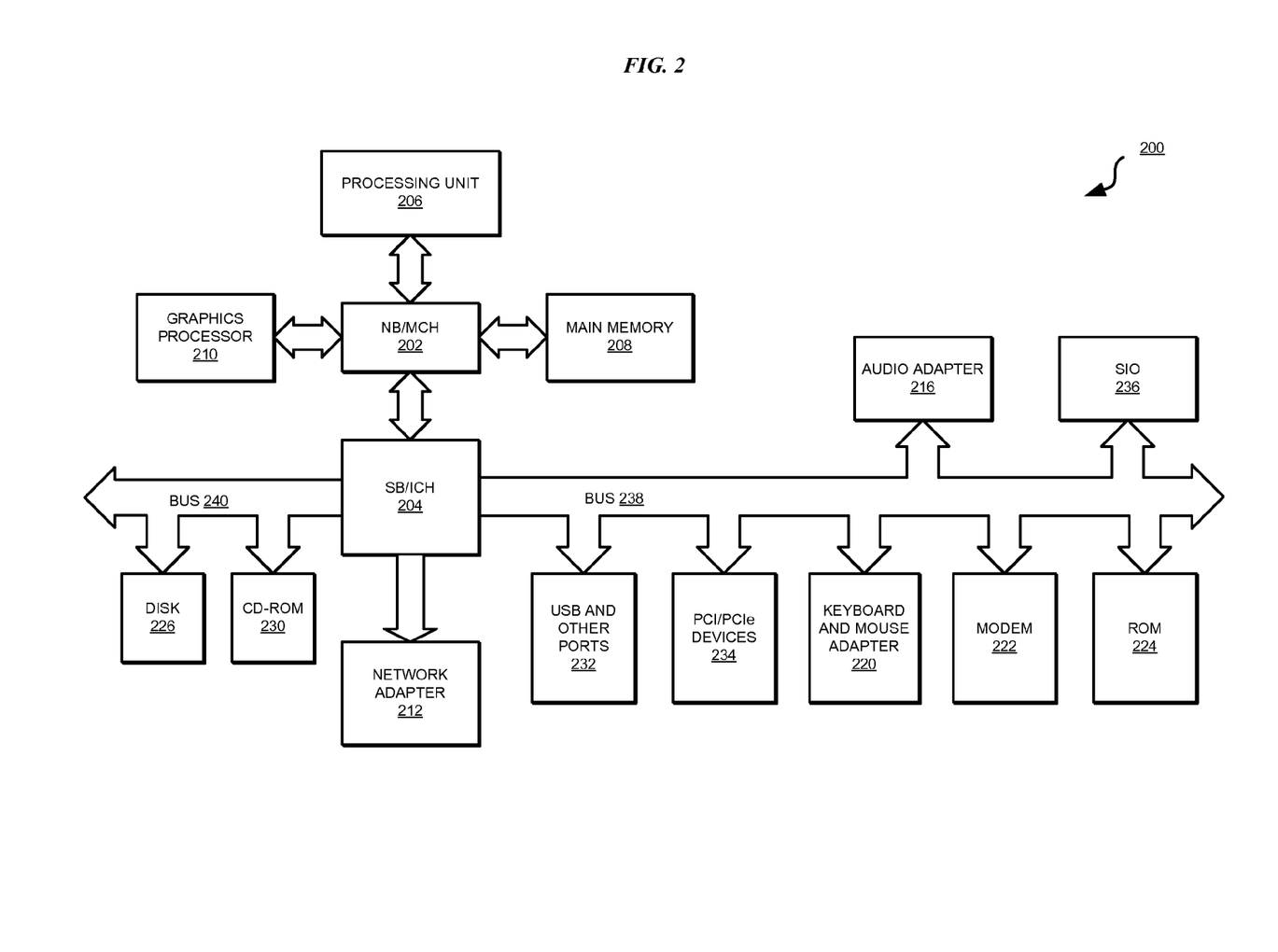
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 105 in server 104 implements an embodiment for contextual updating of existing documents using natural language processing as described herein. NLP engine 107 in server 106 implements a combination of tools and techniques to be used within or in conjunction with application 105 for NLP as described herein. Old documents 109 in storage 108 includes one or more old documents as described herein. Data sources 132 and 134 comprise any number of data sources that are accessible over network 102 and provide current information for one or more contexts. In one embodiment, data source 132 is an example of a local data source, for example, accessible over a bus or a local area network, and data source 134 is an example of an external data source, for example, accessible over a wide area network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, and NLP engine 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
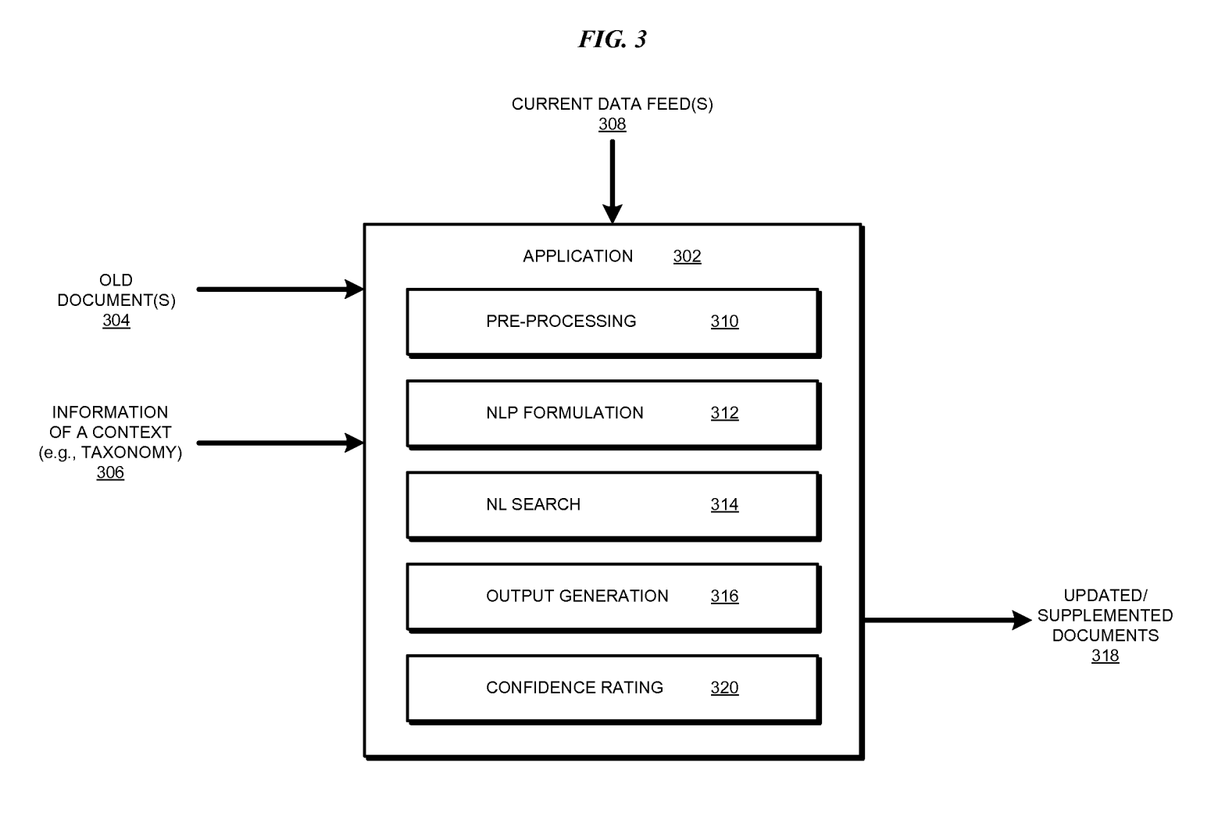
FIG. 3 depicts a block diagram of a configuration for contextual updating of existing documents using natural language processing in accordance with an illustrative embodiment.

With reference to FIG. 3, this figure depicts a block diagram of a configuration for contextual updating of existing documents using natural language processing in accordance with an illustrative embodiment. Application 302 is an example of application 105 in FIG. 1.

Application 302 receives one or more old document 304 as an input. Application 302 further receives as input information 306 about a context. For example, in one embodiment, information 306 about a context is taxonomy of a subject-matter domain. One or more current data feeds 308 from one or more data sources, e.g., data sources 132 and 134 in FIG. 1, form another input to application 302.

Pre-processing component 310 identifies one or more portions in old document 304 that correspond to the context of information 306. Operating according to an embodiment, application 302 updates these identified portions with current contextual information.

NLP formulation component 312 parses the contents of the portions identified by component 310. The parsing of the content by component 312 enables an NLP engine, e.g., NLP engine 107 in FIG. 1, to form NL search queries, criteria, or a combination thereof. The NLP engine (not shown) accepts the parsed contents of the portions as input and provides the NL search queries, search criteria, or a combination thereof, back to application 302.

Component 314 uses the NL search queries or criteria to perform a search for current information such that the resulting information is usable for updating the portions identified by component 310. In other words, component 314 performs a contextual search resulting in information that is current at the time of executing the search, satisfies the search queries or criteria returned by the NLP engine, is relevant to the context of a portion identified by component 310, and is usable for updating that portion. For example, component 314 directs the contextual search to data sources including, but not limited to, news feeds, social media sources, and crowd sources Component 316 generates an output using the result of the search. For example, component 316 receives the search results from a variety of data sources in response to the search queries or criteria. Different data sources may provide their respective information in differing forms. For example, one data source may provide current information in tabular form, and another data source may provide current information in narrative text form. Another data source may provide current information in the form of database records, and another data source may provide current information in a comma delimited form.

Component 316 prepares the current information received from the various data sources for an NLP engine. For example, component 316 aggregates the search results, and parses the aggregate contents in a manner suitable for consumption by the given NLP engine.

The NLP engine returns the current information collected in this manner in a suitable human readable form. Component 316 presents the returned human readable form of the current information as the output of component 316.

In one embodiment, the output of component 316, takes the form of updated document 318. In one embodiment, the output comprises one or more supplements to old document 304. In another embodiment, component 316 modifies one or more of the identified portions in old document 304 with the human readable current information received from the NLP engine.

In another embodiment, component 316 does not pass the result of the search query or criteria to an NLP engine. Component 316 identifies the data source contributing one or more pieces of current information in the result. Component 316 produces updated document 318 where a reference to the contributing data source is inserted in the identified portion of old document 304. In other words, old document 304, including one or more references to one or more data sources in one or more portions forms updated document 318 in such an embodiment. Only as an example and without implying any limitation thereto, the reference can take the form of a uniform resource locator (URL) or a similarly purposed variation thereof.

Another embodiment causes component 316 to use the human readable information returned from the NLP engine as well as references to the data sources. Accordingly, updated document 318 includes a modified portion or a supplement containing the human readable current information and a reference to a data source that contributed the underlying data for the human readable current information.

In some cases, an actual update of old document 304 may not be preferred or desirable. For example, even when current contextual information is available, certain implementations may delegate the updating activity to another application or user, such as for verification of the current contextual information, authorization of the updating activity on old document 304, or billing/accounting/audit resulting from such updates, or other reasons. Accordingly, updated document 318 may associate with a portion, not an actual update incorporating the current contextual information but an indicator to indicate that the portion should be updated in view of the current contextual information. Some examples of associating the indicators in this manner include flagging, marking a checkbox, adding a graphic, highlighting, font or color change, and suitably incorporating other similarly purposed indicators in old document 304.

Whether updated document 318 includes update indicators, aggregated current information, human readable current information, reference to data sources, supplements, or an otherwise modified portion is implementation dependent. Some implementations may find one type of updated document 318 more suitable than another under certain circumstances. The illustrative embodiments do not impose any restriction on the particular form output 318 takes, and the various forms or combinations thereof are contemplated within the scope of the illustrative embodiments.

According to one embodiment, application 302 further includes component 320 for associating a confidence rating with the current information updates applied in updated document 318. The confidence rating of a current information update in updated document 318 is indicative of a reliability of the current information, recency of that information, provenance of a data source that supplied the underlying current information, relevance of the update to the context of information 306, or a combination of these and other factors.

For example, the current information from one data source may be more reliable than the current information from another data source in the search result set. As another example, the degree of relevance of the current information from one data source to the context may be greater than the relevance of the current information from another data source. As another example, the current information from one data source may be more recent than the current information from another data source.

Accordingly, an update based on the information from the first source receives a higher confidence rating than an update based on the information from the second source. When the update includes information from several sources, component 320 computes the overall confidence rating of the update by suitably weighting the sources, the underlying information provided by those sources, and any number of other confidence rating factors.

Figure 4:
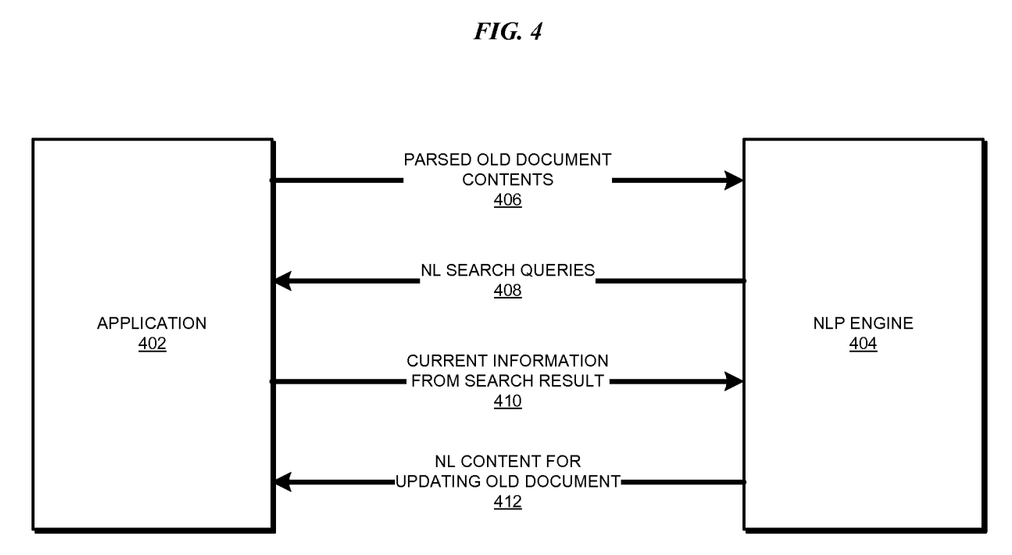
FIG. 4 depicts a configuration for using NLP in contextual updates to old documents in accordance with an illustrative embodiment.

With reference to FIG. 4, this figure depicts a configuration for using NLP in contextual updates to old documents in accordance with an illustrative embodiment. Application 402 is an example of application 302 in FIG. 3. NLP engine 404 is an example of NLP engine 107 in FIG. 1.

Application 402 sends parsed contents 406 from an old document, such as from a portion identified in old document 304 in FIG. 3 according to a context, to NLP engine 404. NLP engine 404 returns to application 402 one or more NL search queries, NL search criteria, or a combination thereof (408).

Application 402 executes a search for current information according to NL search queries and/or criteria 408. Application 402 sends parsed current information 410 from the search result to NLP engine 404. NLP engine 404 returns to application 402 NL content 412. NL content 412 includes the contextual current information received from one or more data sources as a result of NL search queries 408, such that the contextual current information is presented in a human readable natural language form. Application 402 uses NL content 412 for updating the old document, e.g., to output updated document 318 of FIG. 3.

Figure 5:
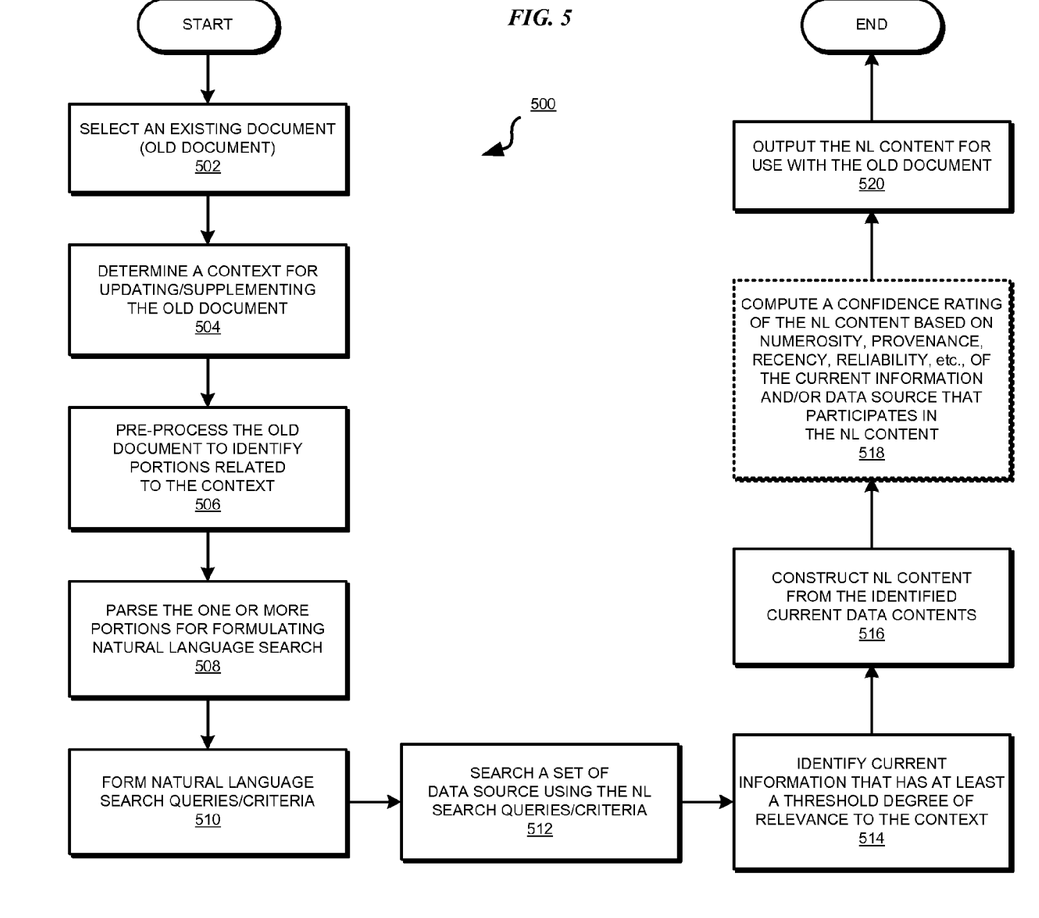
FIG. 5 depicts a flowchart of an example process for contextual updating of existing documents using natural language processing in accordance with an illustrative embodiment.

With reference to FIG. 5, this figure depicts a flowchart of an example process for contextual updating of existing documents using natural language processing in accordance with an illustrative embodiment. Process 500 can be implemented in application 402 in FIG. 4.

The application selects an existing document, e.g., old document 304 in FIG. 3 (block 502). The application determines a context for updating or supplementing the old document or a portion thereof, e.g., according to information 306 about a context in FIG. 3, (block 504).

The application pre-processes the old document to identify one or more portions related to the context (block 506). The application parses one or more of the identified portions to enable an NLP engine to construct a natural language search for current information that is relevant to the context and applicable to the parsed portions (block 508).

The application forms one or more natural language search queries or criteria, such as by passing the parsed information of block 508 to an NLP engine (block 510). Using the NL search queries or criteria formed in block 510, the application searches a set of data sources for current information (block 512). In one embodiment, a data source in the set of data source being searched is available as one or more input data streams from any suitable type of data source.

From the search result set, the application identifies the current information that has at least a threshold degree of relevance to the context (block 514). The application constructs NL content from the current information identified in block 514, e.g., by parsing and sending the parsed current information of block 514 to an NLP engine (block 516).

Optionally, the application also computes a confidence rating for the NL content constructed in block 516 (block 518). For example, in one embodiment, the application computes the confidence rating based on suitably weighted numerosity, provenance, recency, reliability, or a combination of these or other similarly purposed confidence factors associated with a data source, and/or the current information they provide, that participates in the NL content of block 516.

The application outputs the NL content for use with the old document (block 520). The application ends process 500 thereafter. For example, the application can output the NL content in any of the example forms of updated document 318 in FIG. 3, in any of the forms described in FIG. 6, or other similarly purposed form.

Figure 6:
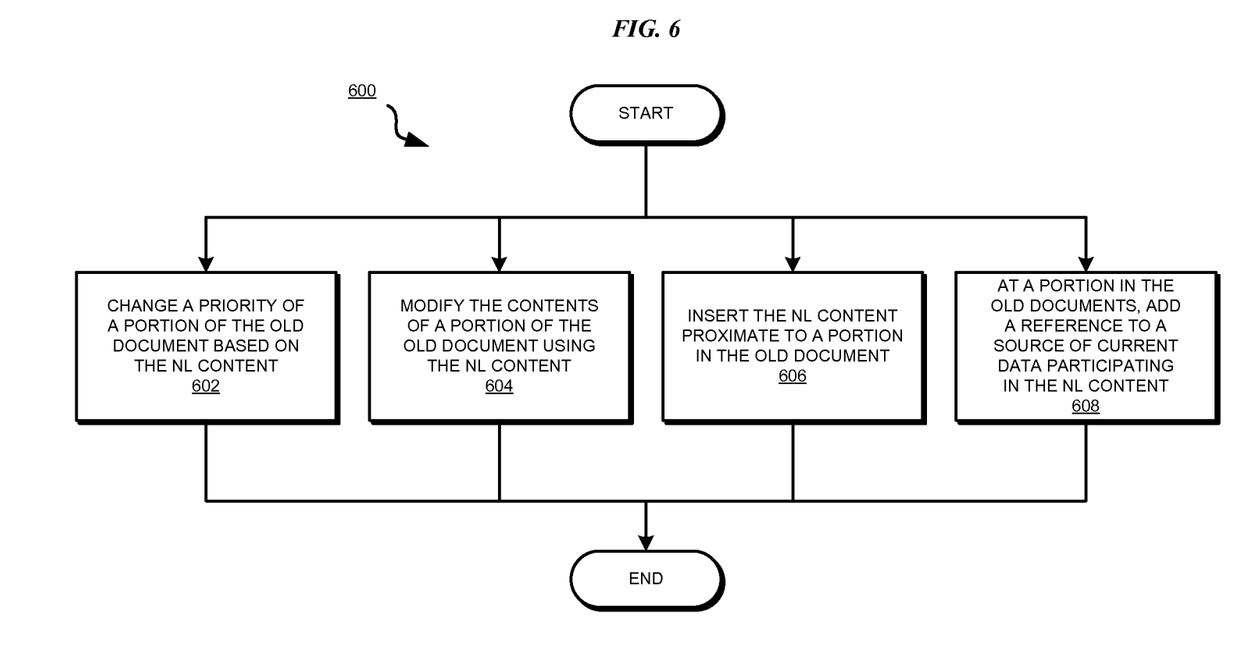
FIG. 6 depicts a flowchart of an example process for updating an old document with current contextual information in accordance with an illustrative embodiment.

With reference to FIG. 6, this figure depicts a flowchart of an example process for updating an old document with current contextual information in accordance with an illustrative embodiment. Process 600 can be implemented in application 402 if FIG. 4, e.g. in block 520 of process 500 in FIG. 5.

For updating an old document, or a portion thereof, that pertains to a given context, the application can use any of the non-exhaustive update methods according to alternative blocks of process 600. For example, the application can change a priority of a portion of the old document based on the NL content of block 516 of FIG. 5 (block 602). For example, if the portion pertains to a context of a product feature that was of low (or high) priority for discussion at a past time, and the NL content suggests that the industry adoption of that product feature has significantly increased (or decreased) at a present time, the application changes a priority associated with that portion of the old document so that the product feature is accorded a higher (or lower) importance in an upcoming discussion.

Alternatively, the application can modify the contents of the portion of the old document using the NL content (block 604). The modification may replace the entire portion, or selectively change the portion.

Alternatively, the application can insert the NL content proximate to the portion in the old document (block 606). For example, the application can add the NL content adjacent to the old content of the portion, or add the NL content elsewhere in the old document as an appendix or supplement to the portion.

Alternatively, at the portion in the old document, the application can add one or more references to a data source that contributed some current contextual information. The application can similarly add a reference to the NL content or non-NL content generated from the current contextual information in a search result.

The application ends process 600 thereafter. The application can select more than one alternatives for updating a portion or different portions of one or more old documents. Furthermore, from this disclosure, other ways of updating portions of old documents using the current contextual information will be conceivable to those of ordinary skill in the art and the same are contemplated within the scope of the illustrative embodiments. For example, the application may only flag a portion of the old document in view of current contextual information, for some other process to perform the actual update.

Thus, a computer implemented method, system, and computer program product are provided in the illustrative embodiments for contextual updating of existing documents using natural language processing. In one embodiment, the types of data sources providing current information can include but are not limited to social media, blogs, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for updating an existing document using natural language processing (NLP), the method comprising:
    receiving information about a subject-matter domain;
    identifying a portion of the existing document, wherein the portion corresponds to the subject-matter domain by including at least a threshold number of references to a category identified in the subject matter domain;
    lemmatizing, using a processor and a memory, a group of words from the portion to use in a search query, wherein the search query returns a result set, the result set including current information corresponding to the subject-matter domain, the current information being recent as compared to an age of the portion;
    forming, using the processor and the memory, natural language (NL) update content by processing the current information through an NLP application;
    associating with the NL update content a confidence rating, the confidence rating being indicative of a provenance of a data source that supplied the current information; and
    updating, by changing the portion of the existing document in a document repository, the existing document using the NL update content and the confidence rating.

2. The method of claim 1, where the updating further comprises:
    changing a priority of the portion relative to a priority of a second portion in the existing document, wherein the priority of the portion is indicative of an ordering of the portion relative to the second portion.

3. The method of claim 1, where the updating further comprises:
    modifying a content of the portion in the existing document, wherein the modifying replaces at least a part of the content.

4. The method of claim 1, where the updating further comprises:
    modifying a content of the portion in the existing document, wherein the modifying supplements the portion.

5. The method of claim 1, where the updating further comprises:
    modifying a content of the portion in the existing document, wherein the modifying adds to the portion a first reference, wherein the first reference is usable to access a first data source that provided information responsive to the search query.

6. The method of claim 1, where the updating further comprises:
    modifying a content of the portion in the existing document, wherein the modifying adds to the portion a first reference, wherein the first reference is usable to access the NL update content.

7. The method of claim 1, further comprising:
    selecting from the result set the current information, wherein the selecting determines that the current information corresponds to the subject-matter domain by including at least a threshold amount of content from the information about the subject-matter domain.

8. The method of claim 1, wherein the portion corresponds to the subject-matter domain by including at least a threshold amount of content from the information about the subject-matter domain.

9. The method of claim 1, wherein the subject-matter domain is a context, and wherein information about the subject-matter domain is in the form of taxonomy of the subject-matter domain.

10. The method of claim 1, further comprises:
    associating with the portion, an indication, wherein the indication identifies the portion as being a candidate for the updating.

11. The method of claim 1, wherein the method is embodied in a computer program product comprising one or more computer-readable storage devices and computer-readable program instructions which are stored on the one or more computer-readable storage devices and executed by one or more processors.

12. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories.

13. A computer program product for updating an existing document using natural language processing (NLP), the computer program product comprising:
- one or more computer-readable storage devices;
- program instructions, stored on at least one of the one or more storage devices, to receive information about a subject-matter domain;
- program instructions, stored on at least one of the one or more storage devices, to identify a portion of the existing document, wherein the portion corresponds to the subject-matter domain by including at least a threshold number of references to a category identified in the subject matter domain;
- program instructions, stored on at least one of the one or more storage devices, to lemmatize a group of words from the portion to use in a search query, wherein the search query returns a result set, the result set including current information corresponding to the subject-matter domain, the current information being recent as compared to an age of the portion;
- program instructions, stored on at least one of the one or more storage devices, to form natural language (NL) update content by processing the current information through an NLP application;
- program instructions, stored on at least one of the one or more storage devices, to associate with the NL update content a confidence rating, the confidence rating being indicative of a provenance of a data source that supplied the current information; and
- program instructions, stored on at least one of the one or more storage devices, to update, by changing the portion of the existing document in a document repository, the existing document using the NL update content and the confidence rating.

14. The computer program product of claim 13, wherein the program instruction to update further comprises:
- program instructions, stored on at least one of the one or more storage devices, to change a priority of the portion relative to a priority of a second portion in the existing document, wherein the priority of the portion is indicative of an ordering of the portion relative to the second portion.

15. The computer program product of claim 13, wherein the program instruction to update further comprises:
- program instructions, stored on at least one of the one or more storage devices, to modify a content of the portion in the existing document, wherein the modifying replaces at least a part of the content.

16. The computer program product of claim 13, wherein the program instruction to update further comprises:
- program instructions, stored on at least one of the one or more storage devices, to modify a content of the portion in the existing document, wherein the modifying supplements the portion.

17. The computer program product of claim 13, wherein the program instruction to update further comprises:
- program instructions, stored on at least one of the one or more storage devices, to modify a content of the portion in the existing document, wherein the modifying adds to the portion a first reference, wherein the first reference is usable to access a first data source that provided information responsive to the search query.

18. The computer program product of claim 13, wherein the program instruction to update further comprises:
- program instructions, stored on at least one of the one or more storage devices, to modify a content of the portion in the existing document, wherein the modifying adds to the portion a first reference, wherein the first reference is usable to access the NL update content.

19. The computer program product of claim 13, further comprising:
- program instructions, stored on at least one of the one or more storage devices, to select from the result set the current information, wherein the selecting determines that the current information corresponds to the subject-matter domain by including at least a threshold amount of content from the information about the subject-matter domain.

20. A computer system for updating an existing document using natural language processing (NLP), the computer system comprising:
- one or more processors, one or more computer-readable memories and one or more computer-readable storage devices;
- program instructions, stored on at least one of the one or more storage devices for execution by at least one of the one or more processors via at least one of the one or more memories, to receive information about a subject-matter domain;
- program instructions, stored on at least one of the one or more storage devices for execution by at least one of the one or more processors via at least one of the one or more memories, to identify a portion of the existing document, wherein the portion corresponds to the subject-matter domain by including at least a threshold number of references to a category identified in the subject matter domain;
- program instructions, stored on at least one of the one or more storage devices for execution by at least one of the one or more processors via at least one of the one or more memories, to lemmatize a group of words from the portion to use in a search query, wherein the search query returns a result set, the result set including current information corresponding to the subject-matter domain, the current information being recent as compared to an age of the portion;
- program instructions, stored on at least one of the one or more storage devices for execution by at least one of the one or more processors via at least one of the one or more memories, to form natural language (NL) update content by processing the current information through an NLP application;
- program instructions, stored on at least one of the one or more storage devices for execution by at least one of the one or more processors via at least one of the one or more memories, to associate with the NL update content a confidence rating, the confidence rating being indicative of a provenance of a data source that supplied the current information; and
- program instructions, stored on at least one of the one or more storage devices for execution by at least one of the one or more processors via at least one of the one or more memories, to update, by changing the portion of the existing document in a document repository, the existing document using the NL update content and the confidence rating.

* * * * *